No. 657,138. Patented Sept. 4, 1900.
W. SMETHURST.
FURNACE.
(Application filed Jan. 3, 1900.)

(No Model.) 2 Sheets—Sheet 1.

WITNESSES:

INVENTOR
William Smethurst
BY
ATTORNEYS

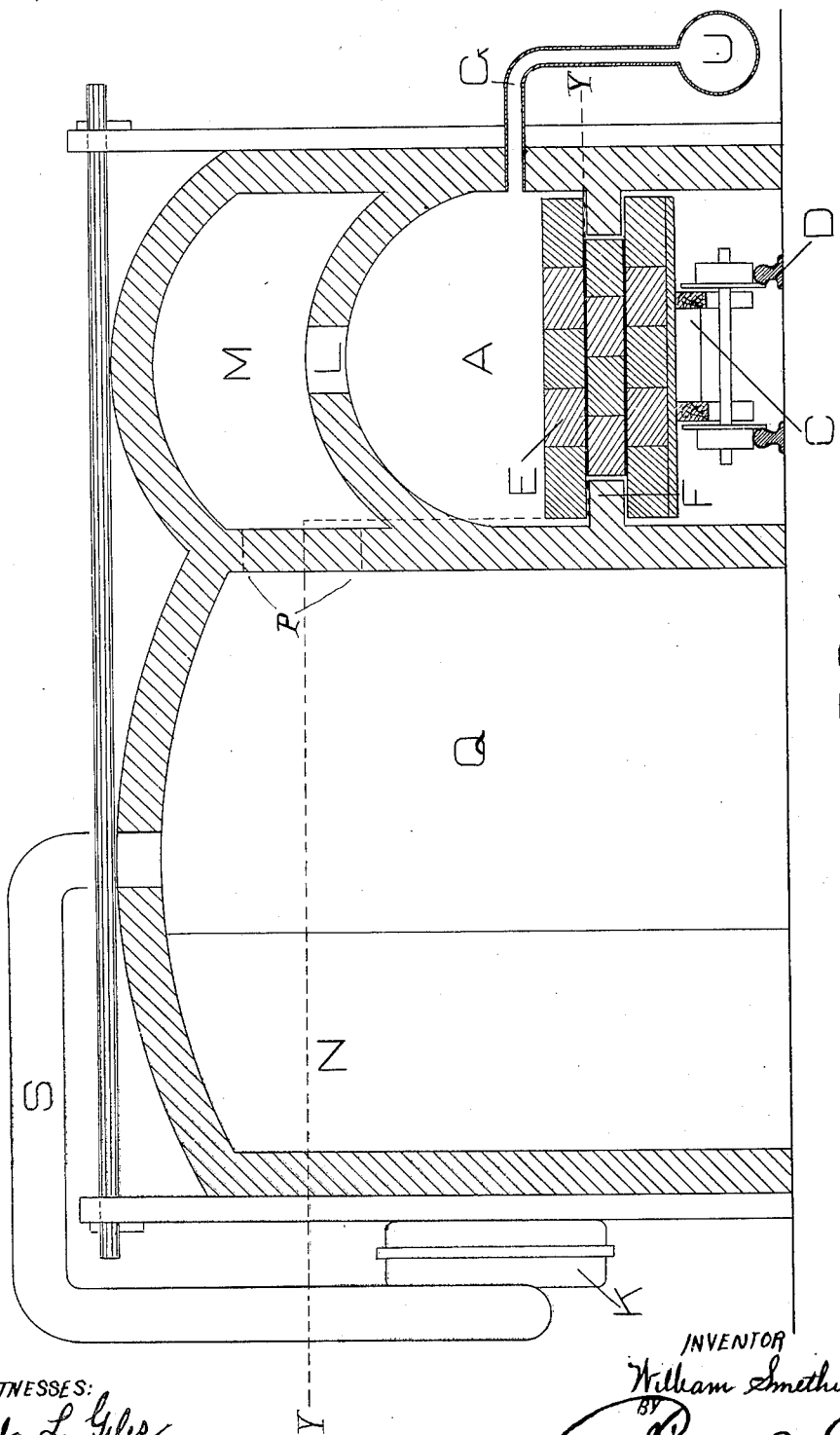

UNITED STATES PATENT OFFICE.

WILLIAM SMETHURST, OF DOLGELLY, ENGLAND.

FURNACE.

SPECIFICATION forming part of Letters Patent No. 657,138, dated September 4, 1900.

Application filed January 3, 1900. Serial No. 282. (No model.)

*To all whom it may concern:*

Be it known that I, WILLIAM SMETHURST, a subject of the Queen of Great Britain and Ireland, residing at Dolgelly, North Wales, England, have invented a new and Improved Furnace for the Treatment of Auriferous Refractory Ores with Collection of By-Products, (for which I have made application for Letters Patent in Great Britain under No. 11,894 and date June 7, 1899,) of which the following is a specification.

This invention relates to furnaces for the roasting of refractory ores or like materials, but is especially applicable to the roasting of refractory auriferous ores containing sulfur, antimony, and arsenic; and it consists of a combination of devices whereby the ore or like material may be cheaply traveled through the furnace for a sufficient time to effect the volatilization of certain substances, such as sulfur, antimony, and arsenic, and of separating and collecting chambers for the collection of these volatile substances as by-products, thus reducing the cost of treatment and rendering the ore immediately amenable to the most ordinary and simple treatment by amalgamation for the recovery of the precious metals therefrom, and in order that my invention may be the better understood I will now proceed to describe the same, with reference to the drawings hereto annexed and to the letters marked thereon.

Figure 1:
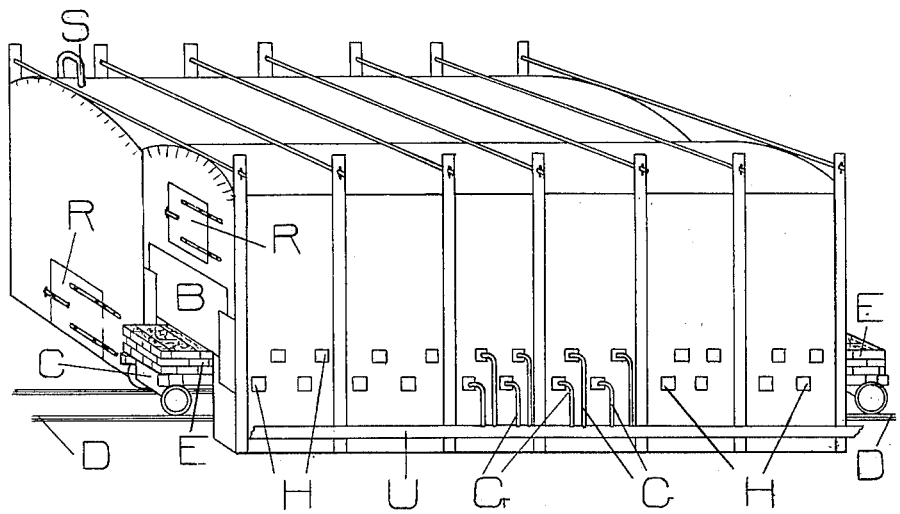
Figure 2:
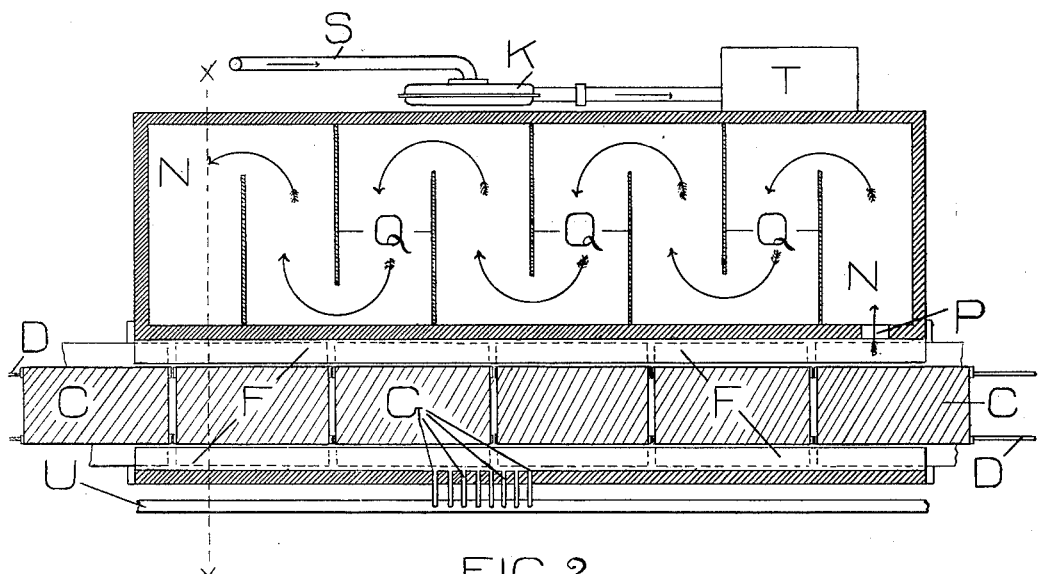

Figure 1 is a perspective elevation of my complete furnace. Fig. 2 is a sectional plan of the same on line Y Y, and Fig. 3 is a transverse section of the same on line X X.

The roasting-chamber of my furnace is in the form of a tunnel A, adapted to be partially or wholly closed by doors B at either end. The hearth of the furnace, when in use, is formed by trucks C, traveling on an ordinary iron track D, laid right through the tunnel A. The frame of the trucks is covered with layers of fire-bricks E, adapted to support the ore or other material to be roasted and forming, by close proximity to the sides of the tunnel and to one another and by enveloping a projecting course F of the side of the tunnel, a sufficient seal to the bottom of the furnace-chamber without absolute contact therewith. The necessary heat for roasting the ore or like material on the trucks is obtained through side orifices H in the walls of tunnel from twyer or blow pipes G, connected to a main U, supplied at the required pressure with such an admixture of combustible gas, such as producer-gas, and air as may be required to produce either an oxidizing or reducing blast. Such holes H as are not required for admission of combustible gas may be closed or left open to admit air if required. The ore or like material on the truck-hearths is reduced to a fairly-uniform stratum by passing under the adjustable doors B on entering, the said doors being set to skim off any surplus depth. The ore or like material is thus traveled through the tunnel-furnace A in any desired period of time and all desired volatile constituents, such as the sulfur, antimony, and arsenic, are there volatilized by roasting the charge in such furnace varying from about 200° to 700°. Such volatile products are drawn by an aspirating-fan K through an aperture or apertures L in the roof of the furnace to a first collecting chamber M, conveniently above the furnace, which chamber has about 300° Fahrenheit in temperature. Here the least-volatile constituents of the vaporized products, such as the sulfur, condense and may be collected, while the more-volatile constituents, such as arsenic and antimony, are drawn farther on into a much larger condensing-chamber N through an aperture or apertures P in the dividing-wall between the chambers M and N and high up in such wall. This chamber N is also provided with alternately-placed baffle-plates Q Q, against which the passing vapors strike and by which condensation is increased. The temperature of this chamber is little above that of the external atmosphere, and the antimony and arsenic may there be collected as oxids or sulfids, as desired, according to whether the gas and air supply to the furnace through the twyers G and the air-doors H is made a neutral or an oxidizing blast, as before described.

Suitable doors R R, adapted to close gas-tight, are provided in the chambers M N, by which access may be obtained for the collection of the condensed products therein.

The aspirating-fan K by its suction-pipe S creates a sufficient draft or suction to draw the volatile products in the direction desired in lieu of a chimney, and such final products of combustion or uncondensed gases as may pass through it are finally discharged into or through a water-tank T, where noxious fumes are finally condensed.

The value of the by-products thus obtained by the roasting of arsenical or antimonial sulfid ores covers to a great extent the cost of such roasting, leaving the ores, if auriferous, excellently amenable to the ordinary and simple forms of amalgamation or other known processes for the recovery of the precious metals.

Having now described my invention, what I claim, and desire to secure by Letters Patent, is—

In combination, a tunnel-furnace chamber, hearths mounted on truck-frames, a rail-track through the tunnel-furnace carrying said trucks, adjustable sliding doors to close the furnace ends, side apertures above the hearths, twyers or nozzles in part of the side apertures for the supply of combustible gases, an intermediate collecting-chamber above said tunnel-furnace and connecting therewith at one end, a second collecting-chamber adjacent to the intermediate chamber and connecting therewith at the opposite end, baffle-partitions in said second collecting-chamber, an aspirating-fan connected to said second collecting-chamber, a water-tank, and a pipe connection from said fan to said tank for discharging the gases into said tank, substantially as described.

In witness whereof I have hereunto set my hand in presence of two witnesses.

WILLIAM SMETHURST.

Witnesses:
RICHARD A. HOFFMANN,
CHARLES CARTER.